(12) United States Patent
Miwa et al.

(10) Patent No.: US 10,138,976 B2
(45) Date of Patent: Nov. 27, 2018

(54) VALVE

(71) Applicant: KYB Corporation, Tokyo (JP)

(72) Inventors: Masahiro Miwa, Gifu (JP); Yuta Hoshino, Gifu (JP)

(73) Assignee: KYB Corporation, Tokyo (JP)

( * ) Notice: Subject to any disclaimer, the term of this patent is extended or adjusted under 35 U.S.C. 154(b) by 186 days.

(21) Appl. No.: 15/030,441

(22) PCT Filed: Sep. 26, 2014

(86) PCT No.: PCT/JP2014/075583
§ 371 (c)(1),
(2) Date: Apr. 19, 2016

(87) PCT Pub. No.: WO2015/068489
PCT Pub. Date: May 14, 2015

(65) Prior Publication Data
US 2016/0245361 A1    Aug. 25, 2016

(30) Foreign Application Priority Data

Nov. 8, 2013 (JP) .................................. 2013-232139

(51) Int. Cl.
*F16F 9/348* (2006.01)
*F16K 47/04* (2006.01)
(Continued)

(52) U.S. Cl.
CPC .......... *F16F 9/3484* (2013.01); *F16F 9/3481* (2013.01); *F16K 15/16* (2013.01);
(Continued)

(58) Field of Classification Search
CPC ........ F16F 9/3484; F16F 9/3481; F16F 9/348; F16F 9/3485; F16K 15/16; F16K 31/1226;
(Continued)

(56) References Cited

U.S. PATENT DOCUMENTS 2,648,405 A * 8/1953 Palmer .................... F16F 9/348
                                                      188/320
4,905,799 A * 3/1990 Yamaoka ................ F16F 9/348
                                                      188/280
(Continued)

FOREIGN PATENT DOCUMENTS

JP    02168038 A  *  6/1990  ............. F16F 9/486
JP    2001-082526 A    3/2001

*Primary Examiner* — Jessica Cahill
(74) *Attorney, Agent, or Firm* — Rabin & Berdo, P.C.

(57) ABSTRACT

A valve includes a valve disc that partitions one chamber and another chamber. The valve disc includes annular bosses and seats at each of the one chamber side and the other chamber side, and an auxiliary seat at the other chamber side. The boss is formed to support leaf valves. The seats are formed on outer peripheral sides of the respective bosses. At least one of the seats is disposed to project with respect to the boss of the corresponding chamber side. An outer peripheral end of the seat on the one chamber side is disposed on an outer peripheral side with respect to an outer peripheral end of the seat on the other chamber side. The auxiliary seat is formed on an outer peripheral side of the seat, and have a height equal to or greater than that of the seat on the other chamber side.

5 Claims, 10 Drawing Sheets

(51) Int. Cl.
*F16K 31/122* (2006.01)
*F16K 15/16* (2006.01)

(52) U.S. Cl.
CPC .......... *F16K 31/1226* (2013.01); *F16K 47/04* (2013.01); *Y10T 137/7779* (2015.04)

(58) Field of Classification Search
CPC ............... F16K 47/04; Y10T 137/7779; Y10T 137/7838
See application file for complete search history.

(56) References Cited

U.S. PATENT DOCUMENTS

| | | | | |
|---|---|---|---|---|
| 5,085,300 A * | 2/1992 | Kato | ...................... | F16F 9/348 188/280 |
| 5,219,414 A * | 6/1993 | Yamaoka | .................. | F16F 9/48 188/284 |
| 5,226,512 A * | 7/1993 | Kanari | .................... | F16F 9/512 188/282.2 |
| 6,029,958 A * | 2/2000 | Larsson | .................... | F16F 9/18 188/282.5 |
| 8,157,065 B2 * | 4/2012 | Ashiba | .................... | F16F 9/348 188/282.6 |
| 9,121,524 B2 * | 9/2015 | Ashiba | .................. | F16F 9/3485 |
| 9,194,455 B2 * | 11/2015 | Ashiba | .................. | F16F 9/3484 |
| 9,410,595 B2 * | 8/2016 | Yamada | ................ | F16F 9/3481 |
| 2017/0198778 A1 * | 7/2017 | De Kock | .............. | F16F 9/3482 |

\* cited by examiner

VALVE

TECHNICAL FIELD

The present invention relates to a valve.

BACKGROUND ART

Typically, a valve controls a flowing direction of fluid, such as liquid and gas, a flow rate, or a similar condition. For example, the valve disclosed in JP2001-082526A is embodied as the piston valve for a damper. The valve is held to the rod, which comes in/out the tubular cylinder, so as to be movably inserted into the cylinder in the axial direction.

The piston valve includes the piston and the annular-plate shaped leaf valves. The piston is the valve disc formed in the cylinder to partition the expansion-side chamber and the compression-side chamber filled with hydraulic oil. The leaf valves are laminated on both sides in the axial direction of the piston. Furthermore, the piston includes the annular bosses, the seats, the openings, the expansion-side passage, and the compression-side passage. The bosses are formed on both sides in the axial direction of the piston to support the leaf valves. The seats are formed at outer peripheral sides of these respective bosses. The leaf valves are left from/seated on the seats. The openings are surrounded by the respective seats. The expansion-side passage allows the opening on the expansion-side chamber side to communicate with the compression-side chamber side. The compression-side passage allows the opening on the compression-side chamber side to communicate with the expansion-side chamber side.

During expansion of the damper, when the expansion-side chamber is pressurized and the pressure in the expansion-side chamber reaches the open-valve pressure of the leaf valve on the compression-side chamber side, the outer peripheral portion of the leaf valve is away from the seat on the compression-side chamber side, allowing a communication of the expansion-side passage. Therefore, the damper generates an expansion-side damping force caused by a resistance when the hydraulic oil passes through the expansion-side passage and moves from the expansion-side chamber to the compression-side chamber. On the contrary, during compression of the damper, when the compression-side chamber is pressurized and the pressure in the compression-side chamber reaches the open-valve pressure of the leaf valve on the expansion-side chamber side, the outer peripheral portion of the leaf valve is away from the seat on the expansion-side chamber side, allowing a communication of the compression-side passage. Therefore, the damper generates a compression-side damping force caused by a resistance when the hydraulic oil passes through the compression-side passage and moves from the compression-side chamber to the expansion-side chamber.

The piston disclosed in JP2001-082526A is a mold piston integrated with the piston ring made of synthetic resin, which is mounted to the outer periphery of the piston. Slidable contact with the inner peripheral surface of the cylinder via the piston ring allows the piston to smoothly move inside the cylinder.

To form such mold piston, the pistons that mount the annular-plate shaped base materials, which become the piston rings later, on the outer periphery are vertically stacked. The pistons are sequentially pushed into the heated mold to form the piston rings and to integrate the piston rings and the pistons. At this time, the pistons are pushed into the mold at a large force.

However, depending on the shape of the piston, when the pistons are vertically stacked coaxially and are pushed into the mold, the bosses of the overlapping pistons may not in contact with one another. For example, if the pistons are in contact with only parts at which the seat on the expansion-side chamber side meet the seat on the compression-side chamber side, contacted areas of the pistons may be extremely small.

Thus, with the extremely small contacted areas of the pistons, if the overlapping pistons are pushed into the mold, a load concentrates, possibly resulting in a deformation of the contact parts of the pistons. The deformation of the seats of the pistons provides gaps with the leaf valves left from/seated on the seats, possibly resulting in a leakage of hydraulic oil from the gaps. In the case where the piston, which is the valve disc, is used for the damper as described above, there may be a case that a desired damping force is not obtained.

It should be noted that, a failure involved by the deformation of the above-described seat is a case where the bosses fail to be in contact with one another when the valve disc is used for the damper and when the valve discs are vertically stacked and are handled regardless of the seat shape, whether to install the piston rings, and the mounting method. This failure possibly occurs when the outer diameters (distances from the valve discs to the outer peripheral ends of the respective seats) of the seats on both sides differ.

An object of the present invention is to provide a valve where bosses are not in contact with one another when the valve discs are vertically stacked and handled, and even if outer diameters of seats on both sides differ, a deformation of the seats can be restrained.

According to one aspect of the present invention, a valve includes: a valve disc that partitions one chamber and another chamber; and annular-plate shaped leaf valves laminated on each of the one chamber side and the other chamber side of the valve disc, wherein the valve disc includes: an annular boss formed at each of the one chamber side and the other chamber side to support the leaf valves; a seat formed on an outer peripheral side of the boss on each of the one chamber side and the other chamber side, the leaf valves being left from/seated on the seats; an opening surrounded by each of the seats; one passage that allows the one chamber to communicate with the opening at the other chamber side; and another passage that allows the other chamber to communicate with the opening at the one chamber side, at least one of the seats on the one chamber side and the other chamber side is disposed to project with respect to the bosses, an outer peripheral end of the seat on the one chamber side is disposed on an outer peripheral side with respect to an outer peripheral end of the seat on the other chamber side, and the valve disc includes an auxiliary seat formed on an outer peripheral side of the seat on the other chamber side, the auxiliary seat being disposed at a height identical to the seat on the other chamber side, alternatively, the auxiliary seat projecting with respect to the seat on the other chamber side.

DESCRIPTION OF EMBODIMENTS

Figure 1:
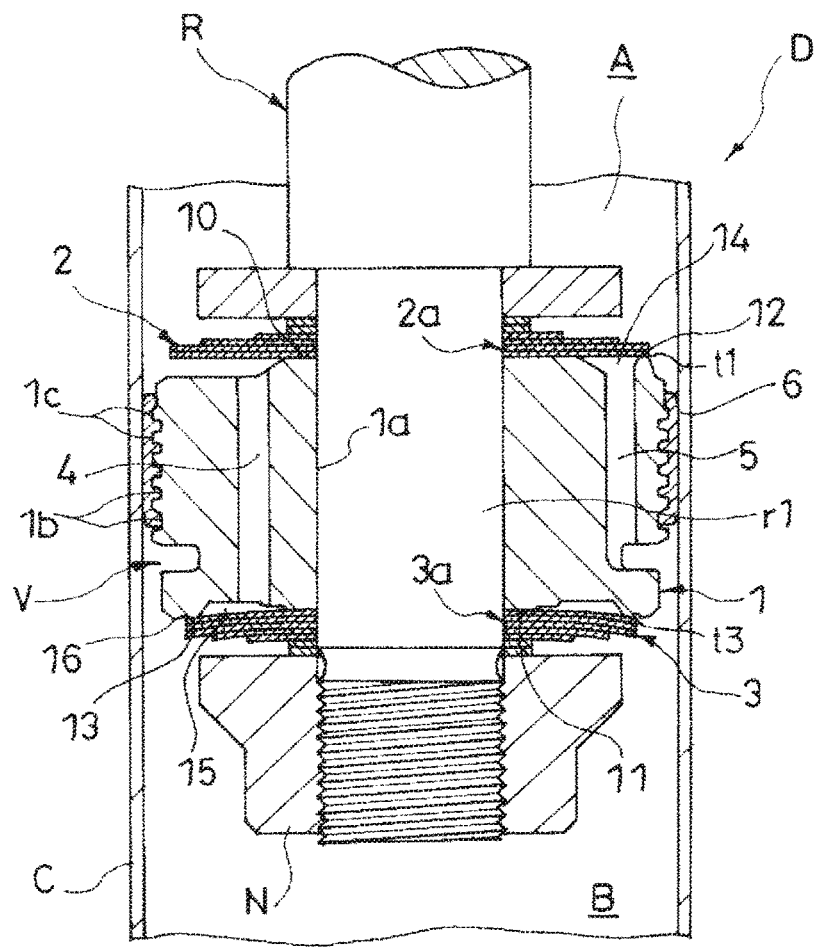
FIG. 1 is a vertical cross-sectional view illustrating a main part of a damper that includes a piston valve (a valve) according to an embodiment of the present invention.

The following describes a configuration of a valve according to the embodiment with reference to FIG. 1 to FIG. 5. Like reference numerals designate corresponding or identical elements throughout some drawings.

In FIG. 1, a valve according to the embodiment is embodied as a piston valve V for a damper D. The piston valve V includes a piston (a valve disc) 1 and annular-plate shaped leaf valves 2 and 3. The piston 1 partitions an expansion-side chamber (one chamber) A and a compression-side chamber (another chamber) B. The leaf valves 2 and 3 are laminated on the expansion-side chamber A side and the compression-side chamber B side of the piston 1, respectively.

The piston 1 includes annular bosses 10 and 11, seats 12 and 13, openings 14 and 15, expansion-side passages (one passages) 4, and compression-side passages (other passages) 5. The bosses 10 and 11 are formed at the expansion-side chamber A side and the compression-side chamber B side, respectively to support the leaf valves 2 and 3. The seats 12 and 13 are formed at outer peripheral sides of these bosses 10 and 11, respectively. The leaf valves 2 and 3 are left from/seated on the seats 12 and 13. These seats 12 and 13 surround the openings 14 and 15, respectively. The expansion-side passages 4 allow the expansion-side chamber A to communicate with the openings 15 on the compression-side chamber B side. The compression-side passages 5 allow the compression-side chamber B to communicate with the openings 14 on the expansion-side chamber A side.

Figure 3A:
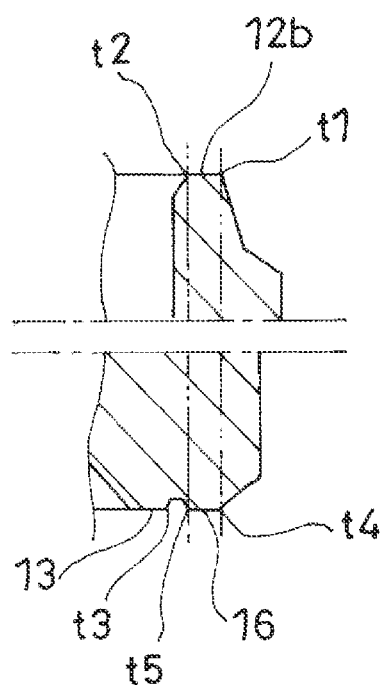
FIG. 3A illustrates a drawing enlarging a part of FIG. 2C.

The seat 13 on the compression-side chamber B side is positioned higher than the boss 11 on the identical side, namely, disposed so as to project. As illustrated in FIG. 3A, an outer peripheral end of the seat 12 on the expansion-side chamber A side (in the embodiment, an outer peripheral end t1 of an arc portion 12b) is disposed on the outer peripheral side with respect to an outer peripheral end t3 of the seat 13 on the compression-side chamber B side. It should be noted that, the "positioned higher" in the piston 1 means that the seat 13 projects from an end surface of the piston 1 in an axial direction, meaning that the seat 13 is positioned on a side opposite from the piston compared with the comparative configuration. The "identical side" in the piston 1 means the identical end surface side of the piston 1 in the axial direction of the piston 1.

Furthermore, the piston 1 includes an auxiliary seat 16. The auxiliary seat 16 is formed on the outer peripheral side of the seat 13 on the compression-side chamber B side and is disposed at a height approximately identical to the seat 13. It should be noted that, the "height" in the piston 1 means positional relationship in the axial direction of the piston 1. That is, the "height identical" in the piston 1 means that the position is identical in the axial direction of the piston 1.

As illustrated in FIG. 1, with the embodiment, the damper D includes a tubular cylinder C, a rod R, the piston valve V, the expansion-side chamber A, and the compression-side chamber B. The rod R comes in/out the cylinder C. The piston valve V is held to a distal end portion of the rod R so as to be movable inside the cylinder C in the axial direction. The expansion-side chamber A is formed on the rod R side of the piston valve V in the cylinder C. The compression-side chamber B is formed on a side opposite from the rod of the piston valve V in the cylinder C. These expansion-side chamber A and compression-side chamber B are filled with hydraulic oil. However, insofar as a damping force can be generated, these expansion-side chamber A and compression-side chamber B may be filled with another fluid. Furthermore, although not specifically illustrated, the damper D includes a division wall such as a free-piston and a bladder, which partitions an air chamber sealed with gas and can be compressed/expanded in the cylinder C. The division wall can compensate a change in internal volume of the cylinder by the volume of the rod R coming in and out the cylinder C with the air chamber.

It should be noted that, the configuration of the damper D can be appropriately changed. For example, the damper D includes an outer pipe standing on the outer periphery of the cylinder C, thus configured to have plural pipes. A reservoir is formed between the outer pipe and the cylinder C to accumulate hydraulic oil. Thus, the change in internal volume of the cylinder may be compensated with the reservoir. In such case, the damper D includes a base valve that supplies the hydraulic oil by the volume of the rod coming in/out the cylinder C from the reservoir to the cylinder C and discharges the hydraulic oil from the cylinder C to the reservoir. Therefore, the embodiment may be embodied as the base valve. With the embodiment, the damper D is a single-rod damper where the rod R stands at only one side of the piston valve V. However, the damper D may be a double-rod damper where the rod R stands on both sides of the piston valve V.

The following describes respective configurations of the piston valve V in detail.

The piston valve V includes the annular piston 1, the plurality of annular-plate shaped leaf valves 2, and the plurality of leaf valves 3. The piston 1 is a valve disc that partitions the expansion-side chamber A and the compression-side chamber B. The leaf valves 2 are laminated on the expansion-side chamber A side of the piston 1. The leaf valves 3 are laminated on the compression-side chamber B side of the piston 1. A mounting portion r1, which is formed at the distal end portion of the rod R, has a diameter smaller than other parts. The mounting portion r1 is inserted into center holes 1a, 2a, and 3a on the piston 1 and the leaf valves 2 and 3, respectively. A nut N is screwed to the distal end of the mounting portion r1. This holds the piston valve V to the distal end portion of the rod R. It should be noted that, the numbers of the leaf valves 2 and 3, which are laminated on the expansion-side chamber A side and the compression-side chamber B side, are not limited to the numbers illustrated in the drawing. The numbers can be appropriately changed.

The piston 1 is formed so as to have a diameter smaller than the cylinder C. A plurality of irregularities 1b and 1c are formed on the outer periphery of the piston 1. On the outer periphery of the piston 1, using these irregularities 1b and 1c, piston rings 6, which are made of synthetic resin, are integrally mounted. The piston 1 according to the embodiment is a mold piston. The piston 1 is slidably contact with the inner peripheral surfaces of the cylinder C via the piston rings 6 and can smoothly move inside the cylinder C in the axial direction.

Figure 2A:
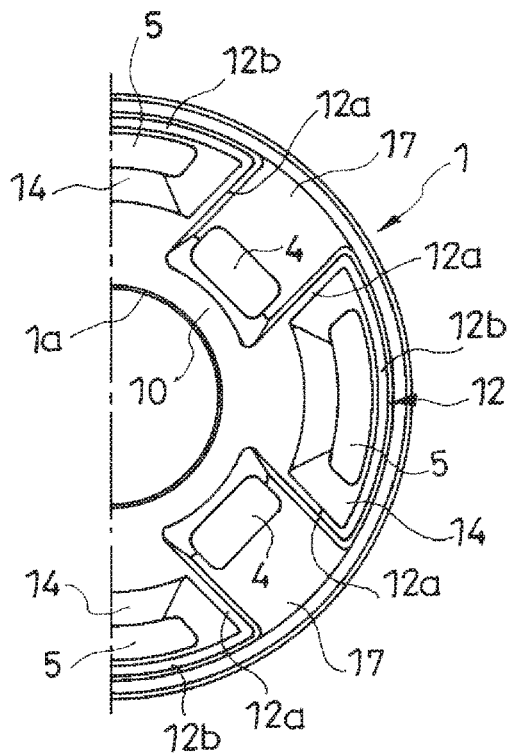
FIG. 2A is a plan view illustrating a piston (a valve disc) in the piston valve (the valve) according to the embodiment of the present invention.
Figure 2B:
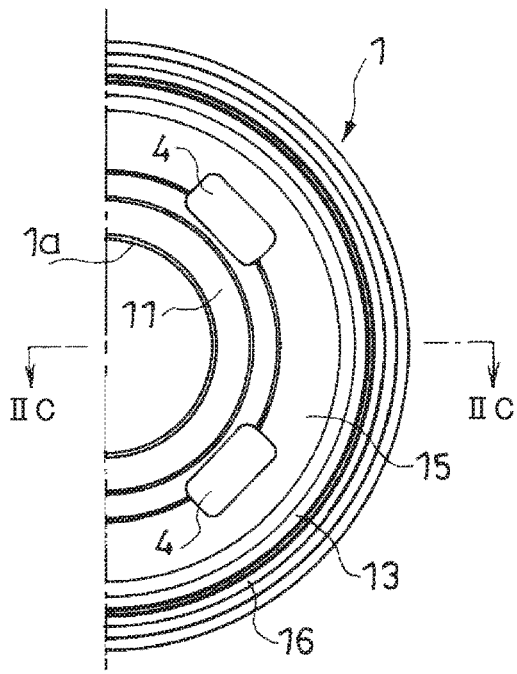
FIG. 2B is a bottom view of the piston (the valve disc) in the piston valve (the valve) according to the embodiment of the present invention.
Figure 2C:
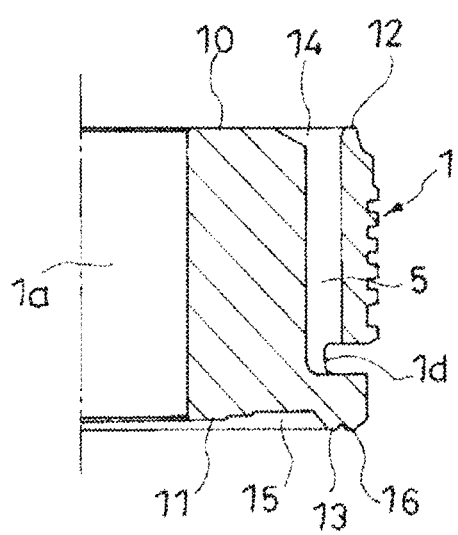
FIG. 2C is a cross-sectional view taken along the line IIC-IIC in FIG. 2B.

As illustrated in FIG. 2A to FIG. 2C, the piston 1 includes the annular boss 10, the seat 12, the openings 14, the annular boss 11, the seat 13, the opening 15, the plurality of expansion-side passages 4, the plurality of compression-side passages 5, and the auxiliary seat 16. The boss 10 is formed on the expansion-side chamber A side, which is the upper side in FIG. 2C, to support the inner peripheral portion of the leaf valve 2 on the identical side. The seat 12 is formed on the outer peripheral side of the boss 10. The leaf valve 2 is left from/seated on the seat 12 by the outer peripheral portion. The seat 12 surrounds the openings 14. The boss 11 is formed on the compression-side chamber B side, which is the lower side in FIG. 2C, to support the inner peripheral portion of the leaf valve 3 on the identical side. The seat 13 is formed on the outer peripheral side of the boss 11. The leaf valve 3 is left from/seated on the seat 13 by the outer peripheral portion. The seat 13 surrounds the opening 15. The expansion-side passages 4 allow the expansion-side chamber A to communicate with the opening 15 on the compression-side chamber B side. The compression-side passages 5 allow the compression-side chamber B to communicate with the openings 14 on the expansion-side chamber A side. The auxiliary seat 16 is formed on the outer peripheral side of the seat 13 on the compression-side chamber B side. The bosses 10 and 11 are support surfaces on which the leaf valves 2 and 3 abut. The seats 12 and 13 are seat surfaces from/on which the leaf valves 2 and 3 are left/seated.

The boss 10 on the expansion-side chamber A side is formed along an opening edge of the center hole 1a on the upper side in FIG. 2C. The seat 12, which is formed on the outer peripheral side of the boss 10, is formed into a petal-like shape. The seat 12 includes a plurality of branches 12a and a plurality of arc-shaped arc portions 12b. The branches 12a radially extend from the boss 10 to the outer peripheral side. The arc portions 12b couple outer peripheral ends of the adjacent branches 12a and are disposed at the outer periphery of the boss 10 spaced at predetermined intervals from the boss 10. Among the branches 12a disposed on both sides, the one branch 12a is coupled only to the one branch 12a with the arc portion 12b.

The respective openings 14 are independently formed between the boss 10 on the expansion-side chamber A side, the arc portions 12b of the seat 12 on the identical side, and the pair of branches 12a, which are coupled with the arc portion 12b. The plurality of openings 14 are disposed at predetermined intervals in the circumferential direction. The leaf valve 2 on the expansion-side chamber A side is secured to the rod R with the inner peripheral portion seated on the boss 10 in an assembled state. The outer peripheral portion of the leaf valve 2 can be left from/seated on the seat 12. In view of this, with the state where the outer peripheral portion of the leaf valve 2 seated on the seat 12, the communication of the openings 14 with the expansion-side chamber A is cut off by the leaf valve 2. In contrast to this, when the outer peripheral portion of the leaf valve 2 deflects to the side opposite from the piston and is away from the seat 12, the communication with the expansion-side chamber A is allowed. To the respective openings 14 on the expansion-side chamber A side, the compression-side passages 5 are continuous. This ensures allowing/cutting off the communication between the compression-side passages 5 and the expansion-side chamber A with the leaf valve 2.

It should be noted that, with the embodiment, the inner peripheral portion of the leaf valve 2 is configured so as not to be separate from the boss 10. However, the assembly structure of the leaf valve 2 can be appropriately changed. For example, the inner peripheral portion of the leaf valve 2 may be left from/seated on the boss 10.

Openings 17 are each formed on the outer peripheral side of the boss 10 on the expansion-side chamber A side and between the pair of branches 12a not coupled with the arc portion 12b of the seat 12 on the identical side. To the respective openings 17, the expansion-side passages 4 are continuous. Even if the leaf valve 2 is seated on the seat 12, the communication of the respective openings 17 with the expansion-side chamber A is not cut off by the leaf valve 2. That is, the expansion-side passages 4 always communicate with the expansion-side chamber A via the openings 17. The plurality of openings 17 are disposed at predetermined intervals in the circumferential direction.

The boss 11 on the compression-side chamber B side is formed along an opening edge of the center hole 1a on the lower side in FIG. 2C. The seat 13, which is formed on the outer peripheral side of this boss 11, is formed into an annular shape. The seat 13 is disposed on the outer periphery of the boss 11 spacing a predetermined interval with the boss 11.

Between the boss 11 on the compression-side chamber B side and the seat 13 on the identical side, an annular opening 15 is formed. The leaf valve 3 on the compression-side chamber B side is secured to the rod R with the inner peripheral portion seated on the boss 11 in an assembled state. The outer peripheral portion of the leaf valve 3 can be left from/seated on the seat 13. In view of this, with the state where the outer peripheral portion of the leaf valve 3 seated on the seat 13, the communication of the opening 15 with the compression-side chamber B is cut off by the leaf valve 3. In contrast to this, when the outer peripheral portion of the leaf valve 3 deflects to the side opposite from the piston and is away from the seat 13, the communication with the compression-side chamber B is allowed. To the opening 15 on the compression-side chamber B side, the plurality of expansion-side passages 4 are continuous. This ensures allowing/cutting off the communication between the expansion-side passages 4 and the compression-side chamber B by the leaf valve 3 at the same time.

It should be noted that, with the embodiment, the inner peripheral portion of the leaf valve 3 is configured so as not to be separate from the boss 11. However, the assembly structure of the leaf valve 3 can be appropriately changed. For example, the inner peripheral portion of the leaf valve 3 may be left from/seated on the boss 11.

An annular groove 1d is formed on the compression-side chamber B side with respect to the piston ring 6 along the circumferential direction on the outer periphery of the piston 1. The groove 1d communicates with the compression-side passages 5. Even if the leaf valve 3 is seated on the seat 13, the communication of the groove 1d with the compression-side chamber B is not cut off by the leaf valve 3 and is not obstructed with the piston ring 6. That is, the compression-side passages 5 always communicate with the compression-side chamber B via between the groove 1d and the cylinder C.

The seat 13 on the compression-side chamber B side is disposed projecting from the boss 11 so as to provide an initial deflection to the leaf valve 3 seated on the boss 11.

With the configuration, during expansion of the damper D where the rod R exits from the cylinder C, the expansion-side chamber A is pressurized, and the leaf valve 2 on the expansion-side chamber A side is pushed to the seat 12 on the identical side, thus cutting off the compression-side passages 5. Furthermore, when the pressure of the expansion-side chamber A reaches an open-valve pressure of the leaf valve 3 on the compression-side chamber B side, the outer peripheral portion of this leaf valve 3 deflects to the side opposite from the piston, allowing the communication of the expansion-side passages 4. In view of this, during expansion, the damper D generates an expansion-side damping force caused by a resistance of the leaf valve 3 when the hydraulic oil passes through the expansion-side passages 4 and moves from the expansion-side chamber A to the compression-side chamber B. As described above, since the initial deflection is provided to the leaf valve 3, the open-valve pressure of the leaf valve 3 can be increased.

On the contrary, during compression of the damper D where the rod R enters to the cylinder C, the compression-side chamber B is pressurized, and the leaf valve 3 on the compression-side chamber B side is pushed to the seat 13 on the identical side, thus cutting off the expansion-side passages 4. Furthermore, when the pressure of the compression-side chamber B reaches an open-valve pressure of the leaf valve 2 on the expansion-side chamber A side, the outer peripheral portion of this leaf valve 2 deflects to the side opposite from the piston, allowing the communication of the compression-side passages 5. In view of this, during compression, the damper D generates a compression-side damping force caused by a resistance of the leaf valve 2 when the hydraulic oil passes through the compression-side passages 5 and moves from the compression-side chamber B to the expansion-side chamber A.

As illustrated in FIG. 3A, both the outer peripheral end t1 of the arc portion 12b, which becomes the outer peripheral end of the seat 12 on the expansion-side chamber A side, and an inner peripheral end t2 of the arc portion 12b are disposed on the outer peripheral side with respect to the outer peripheral end t3 of the seat 13 on the compression-side chamber B side. The outer peripheral end t1 of the arc portion 12b is an arc-shaped edge positioned on the outermost peripheral side on the arc portion 12b. The inner peripheral end t2 of the arc portion 12b is an arc-shaped edge positioned on the innermost peripheral side on the arc portion 12b. The outer peripheral end t3 of the seat 13 is a circular ring-shaped edge positioned on the outermost peripheral side on the seat 13.

Furthermore, the ring-shaped auxiliary seat 16 is formed on the outer periphery of the seat 13 on the compression-side chamber B side. The auxiliary seat 16 is disposed providing a predetermined clearance with the seat 13. The auxiliary seat 16 is disposed at a height approximately identical to the seat 13. An outer peripheral end t4 of the auxiliary seat 16 is disposed at a position approximately identical to the outer peripheral end t1 of the seat 12 (the arc portion 12b) on the expansion-side chamber A side. An inner peripheral end t5 of the auxiliary seat 16 is disposed at a position approximately identical to the inner peripheral end t2 of the arc portion 12b. The outer peripheral end t4 of the auxiliary seat 16 is a circular ring-shaped edge positioned on the outermost peripheral side on the auxiliary seat 16. The inner peripheral end t5 of the auxiliary seat 16 is a circular ring-shaped edge positioned on the innermost peripheral side on the auxiliary seat 16.

As described above, with the embodiment, the boss 11 on the compression-side chamber B side and the seat 13 have a level difference. When the plurality of pistons 1 are vertically stacked coaxially, the boss 10 on the one piston 1 is not in contact with the boss 11 on the other piston 1. However, when the plurality of pistons 1 are vertically stacked coaxially, the branches 12a of the one overlapping piston 1 abut on the seat 13 at parts meeting the seat 13 of the other piston 1. Additionally, the entire arc portions 12b of the one piston 1 abut on the auxiliary seat 16 of the other piston 1. This ensures increasing the contacted areas of the overlapping pistons 1.

Figure 4:
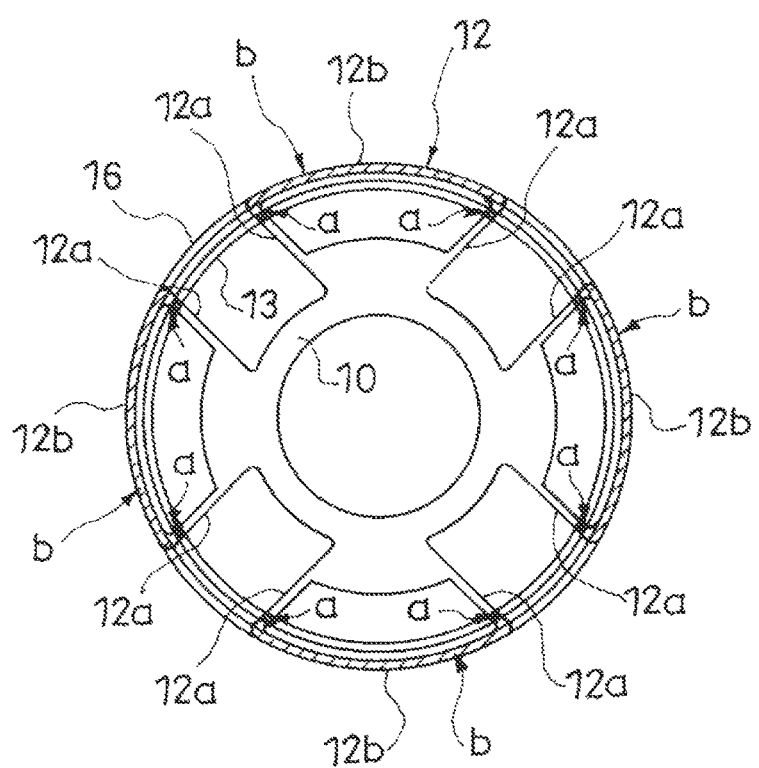
FIG. 4 is an explanatory view illustrating a state where a seat and an auxiliary seat of another piston overlaps with a boss and a seat of an overlapping one piston when the pistons (the valve discs) of the piston valve (the valve) according to the embodiment of the present invention are coaxially stacked.

FIG. 4 is an explanatory view illustrating a state where the seat 13 and the auxiliary seat 16 of the other piston 1 overlap with the boss 10 and the seat 12 of the overlapping one piston 1 when the plurality of pistons 1 are coaxially stacked vertically. The diagonal lines are illustrated in parts a and b at which the one piston 1 and the other piston 1 are in contact.

It should be noted that, the outer peripheral end t4 on the auxiliary seat 16 is disposed at the position identical to the outer peripheral end t1 on the arc portion 12b on the expansion-side chamber A side or on the outer peripheral side with respect to the outer peripheral end t1. Additionally, the inner peripheral end t5 on the auxiliary seat 16 is disposed at the position identical to the inner peripheral end t2 on the arc portion 12b or as shown in FIG. 3C, on the inner peripheral side with respect to the inner peripheral end t2. Then, when the pistons 1 are vertically stacked, the entire arc portions 12b of the one piston 1 can abut on the auxiliary seat 16 of the other piston 1. As long as the arc portions 12b of the one piston 1 can abut on the auxiliary seat 16 of the other piston 1, the auxiliary seat 16 may be formed into the arc shape.

Figure 3B:
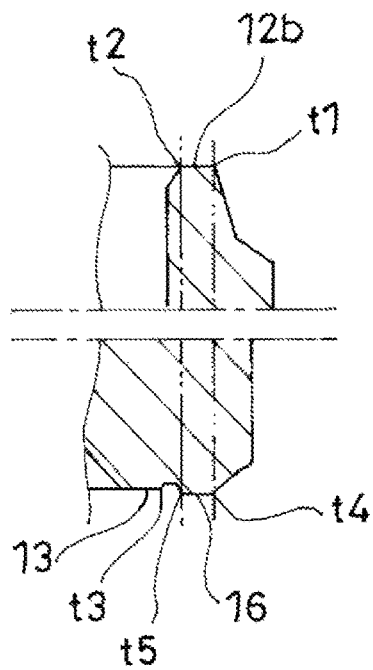
FIGS. 3B and 3C illustrate other examples enlarging the part of FIG. 2C.
Figure 3C:
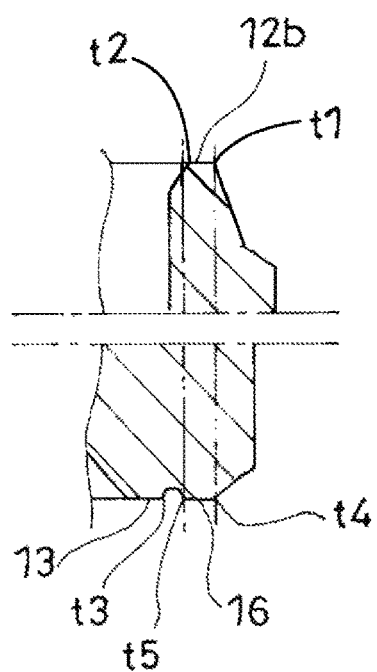

As shown in FIG. 3B, the auxiliary seat 16 may be positioned higher than the seat 13 on the compression-side chamber B side, that is, may be disposed to project. In this case, when the pistons 1 are vertically stacked, the branches 12a of the one piston 1 are not in contact with the seat 13 of the other piston 1. However, since the arc portions 12b of the one piston 1 can be brought in contact with the auxiliary seat 16, this ensures increasing the contacted areas.

With the embodiment, since the leaf valve 3 is not seated on the auxiliary seat 16, the auxiliary seat 16 does not affect the expansion-side damping force.

The following describes a process of respectively mounting piston rings 6 to pistons 1.

Figure 5:
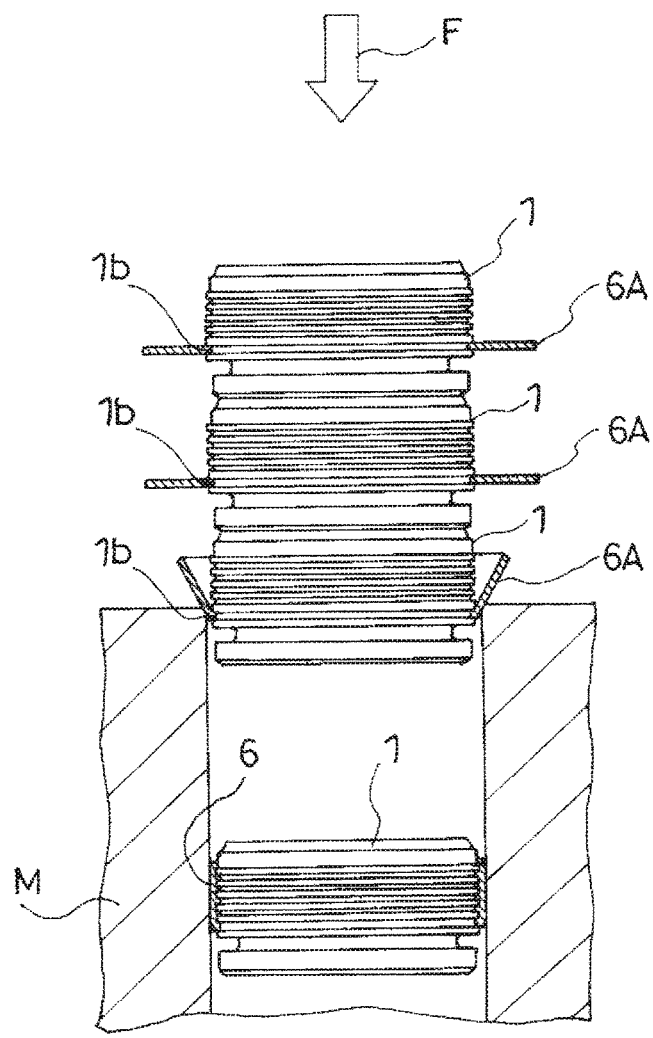
FIG. 5 is an explanatory view illustrating a process of mounting piston rings to the pistons (the valve discs) in the piston valve (the valve) according to the embodiment of the present invention.

As illustrated in FIG. 5, an annular-plate shaped base material 6A made of synthetic resin, which will become a piston ring 6 later, is mounted on one of the hollow portions 1b formed on the outer periphery of the piston 1. The one hollow portion 1b is disposed on a mold M side. Then, the pistons 1 are vertically stacked and are sequentially pushed into the heated mold M. This bends the base materials 6A heated and softened along the outer peripheries of the pistons 1. Further pushing the pistons 1 deforms the base materials 6A according to the outer peripheral shape of the pistons 1 and the inner peripheral shape of the mold M. This forms the piston rings 6, and the piston rings 6 are integrated with the pistons 1.

Here, with reference to FIG. 6A, FIG. 6B, FIG. 6C, and FIG. 7, the following describes the piston valve (the valve) according to a comparative example.

Figure 6A:
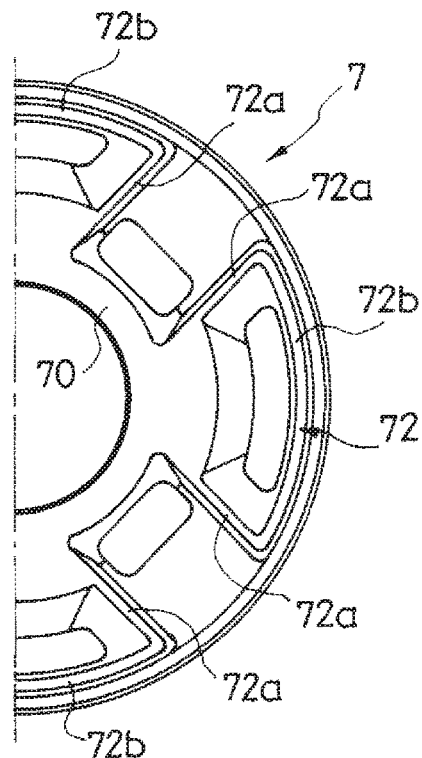
FIG. 6A is a plan view illustrating a piston (a valve disc) in a piston valve (a valve) according to a comparative example.
Figure 6B:
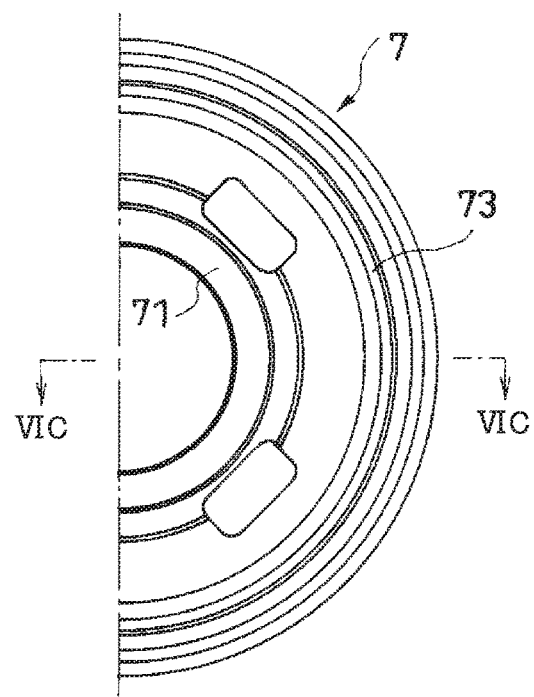
FIG. 6B is a bottom view of the piston (the valve disc) in the piston valve (the valve) according to the comparative example.
Figure 6C:
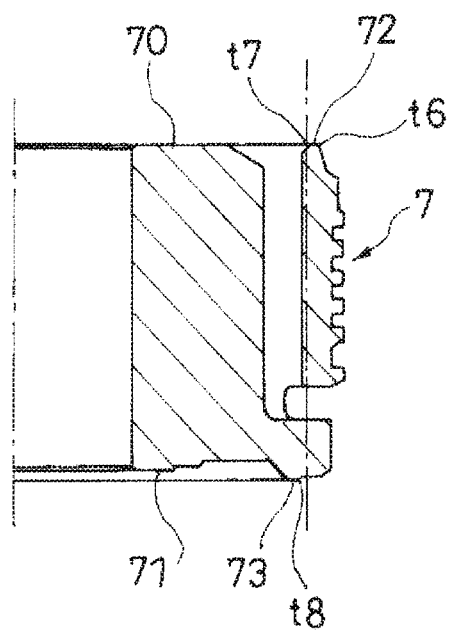
FIG. 6C is a cross-sectional view taken along the line VIC-VIC in FIG. 6B.

In a piston 7, which is illustrated in FIG. 6A to FIG. 6C, a seat 72, which is formed on the expansion-side chamber side of the piston 7, is formed into a petal-like shape. The piston 7 includes a plurality of branches 72a and a plurality of arc-shaped arc portions 72b. The branches 72a extend from a boss 70 on the identical side to the outer peripheral side. The arc portions 72b couple the outer peripheral ends of these branches 72a. A seat 73, which is formed on the compression-side chamber side of the piston 7, is formed into an annular shape. The seat 73 is disposed on the outer periphery of a boss 71 on the identical side providing predetermined intervals with the boss 71. Furthermore, an outer peripheral end t6 and an inner peripheral end t7 of the arc portion 72b on the expansion-side chamber side are disposed on the outer peripheral side with respect to an outer peripheral end t8 of the seat 73 on the compression-side chamber side. The seat 73 on the compression-side chamber side is disposed at a position higher than the boss 71 (the side opposite from the piston) on the identical side.

With the configuration, the initial deflection is provided to the leaf valve (not illustrated) left from/seated on the seat 73 on the compression-side chamber side to ensure increasing the open-valve pressure of the leaf valve. The leaf valve is formed to have a small diameter, and the pressure-receiving surface is configured to be small, ensuring increasing the expansion-side damping force compared with the compression-side damping force. Accordingly, in the case where the damper with the piston valve having the configuration is interposed between the vehicle body and the wheels of the vehicle, when the damper receives a thrust-input from a road surface by a low compression-side damping force and then the damper turns into an expansion process, this configuration ensures achieving the high expansion-side damping force.

Figure 7:
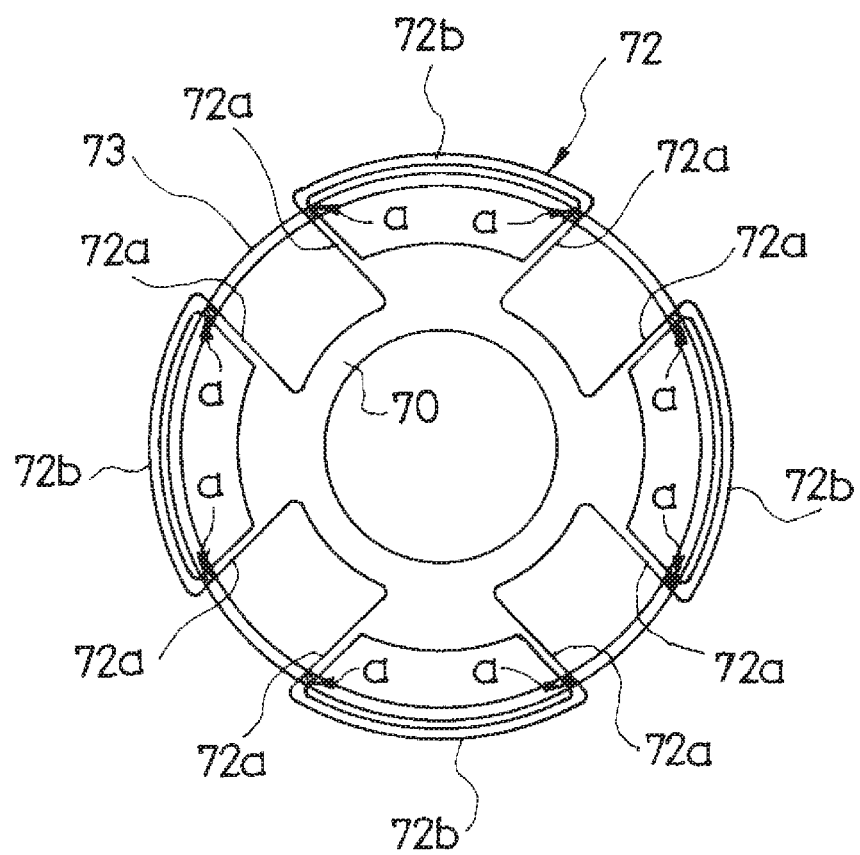
FIG. 7 is an explanatory view illustrating a state where a seat of another piston overlaps with a boss and a seat of an overlapping one piston when the pistons (the valve discs) of the piston valve (the valve) according to the comparative example are stacked coaxially.

However, when the pistons 7 having the configuration are vertically stacked coaxially and are pushed into the mold, the bosses 70 and 71 of the overlapping pistons 7 are not in contact with one another. The pistons 7 are in contact with only parts at which the branches 72a of the seat 72 on the expansion-side chamber side meet the seat 73 on the compression-side chamber side. Thus, the contacted areas of the pistons 7 are extremely small. FIG. 7 is an explanatory view illustrating a state where the seat 73 of the other piston 7 overlaps with the boss 70 and the seat 72 of the overlapping one piston 7 when the plurality of pistons 7 are vertically stacked coaxially. The contacted parts a are indicated with the diagonal lines.

Thus, with the extremely small contacted areas of the pistons 7, if the overlapping pistons 7 are pushed into the mold, a load concentrates, possibly resulting in a deformation of the contact parts (the parts a indicated with the diagonal lines in FIG. 7) of the pistons 7. The deformation of the seats 72 and 73 of the pistons 7 provides gaps with the leaf valves left from/seated on the seats 72 and 73, possibly resulting in a leakage of hydraulic oil from the gaps. In the case where the valve disc (the piston) is used for the damper as described above, there may be a case that a desired damping force is not obtained.

In contrast to this, with the embodiment, as described above, when the pistons 1 are vertically stacked, the bosses 10 and 11 do not abut on one another at the opposed portions of the overlapping pistons 1. However, the entire arc portions 12b of the one overlapping piston 1 abut on the auxiliary seat 16 of the other piston 1. This ensures increasing the contacted areas of the pistons 1. Therefore, when the vertically stacked pistons 1 are pushed into the mold M, even if a large force F is applied to the pistons 1, the load is dispersed, ensuring restraining the deformation of the seats 12 and 13.

The following describes the operational advantages of the piston valve (the valve) V according to the embodiment.

With the embodiment, the piston (the valve disc) 1 is a mold piston integrated with the annular piston ring 6 mounted to the outer periphery of the piston 1.

In the above-described case, it is effective to vertically dispose the pistons 1 coaxially and push the pistons 1 into the mold M to integrate the pistons 1 and the piston rings 6. However, in this case, the pistons 1 are pushed into the mold M with the large force F. Accordingly, like the comparative example, in the case where the bosses 70 and 71 are not in contact and therefore the contacted areas of the seats 72 and 73 are small, there is a high risk to deform the seats 72 and 73. In view of this, in the case where the pistons (the valve discs) 1 are the mold pistons, it is especially effective to dispose the auxiliary seat 16 at the outer periphery of the seat 13 to increase the contacted areas between the pistons 1 and to disperse the load.

Furthermore, with the configuration, the piston ring 6 is in sliding contact with the inner peripheral surface of the cylinder C. This ensures moving the piston (the valve disc) 1 smoothly inside the cylinder C.

It should be noted that, the method of mounting the piston ring 6 is not limited to the method as described above and can be changed appropriately. The valve disc may be except for the piston, and the piston ring 6 may be removed.

With the embodiment, the auxiliary seat 16 is formed into the annular shape. The auxiliary seat 16 is disposed on the outer periphery of the seat 13 on the compression-side chamber (the other chamber) B side spacing the predetermined interval with the seat 13. The outer peripheral end t4 of the auxiliary seat 16 is disposed at a position approximately identical to the outer peripheral end t1 of the arc portion 12b. Additionally, the inner peripheral end t5 of the auxiliary seat 16 is disposed at a position approximately identical to the inner peripheral end t2 of the arc portion 12b.

With the configuration, when the pistons 1 are vertically stacked coaxially, without the position of the pistons 1 circumferentially matched, the entire arc portions 12b in the seat 12 on the expansion-side chamber A side can be supported with the auxiliary seat 16.

It should be noted that, as long as the outer peripheral end t4 of the auxiliary seat 16 is disposed at the position identical to the outer peripheral end t1 of the arc portion 12b or is disposed at the outer peripheral side with respect to the outer peripheral end t1; and the inner peripheral end t5 of the auxiliary seat 16 is disposed at the position identical to the inner peripheral end t2 of the arc portion 12b or is disposed at the inner peripheral side with respect to the inner peripheral end t2, the above-described effects can be provided. The shape of the auxiliary seat 16 is not limited to the above-described shape. As long as the auxiliary seat 16 can abut on the arc portions 12b when the pistons 1 are stacked, the auxiliary seat 16 may be formed into the arc shape or other shapes.

With the embodiment, the seat 12 on the expansion-side chamber (the one chamber) A side is formed into the petal-like shape. The seat 12 includes the plurality of branches 12a and the plurality of arc-shaped arc portions 12b. The branches 12a extend from the boss 10 on the expansion-side chamber A side to the outer peripheral side. The arc portions 12b couple outer peripheral ends of the adjacent branches 12a.

As described above, with the piston (the valve disc) including the seat having the petal-like shape on the one side, like the comparative example, if the outer peripheral end t8 of the seat 73 on the other side is disposed on the inner peripheral side with respect to the outer peripheral end t6 and the inner peripheral end t7 of the petal-like-shaped seat 72, when the pistons 7 are vertically stacked, the overlapping pistons 7 are in contact with only parts at which the branches 72a of the seat 72 on the one side meet the seat 73 on the other side (the parts a indicated with diagonal lines in FIG. 7). Accordingly, the contacted areas are extremely small and the load concentrates; therefore, the deformation is likely to occur. Accordingly, it is significantly effective for the piston 1 with the petal-like-shaped seat 12 on one side to include the auxiliary seat 16 at the outer periphery of the seat 13 on the other side to increase the contacted areas when the pistons 1 are stacked.

It should be noted that, the shapes of the seats 12 and 13 of the piston (the valve disc) 1 can be changed appropriately. For example, both the seats 12 and 13 may be formed into the annular shape and the petal-like shape.

With the embodiment, the piston (the valve disc) 1 includes the auxiliary seat 16. The auxiliary seat 16 is formed on the outer peripheral side of the seat 13 on the compression-side chamber B side and is disposed at a height approximately identical to the seat 13.

With the embodiment, when the pistons (the valve discs) 1 are vertically stacked coaxially, the seat 12 of the one piston 1 is configured to be in contact with the auxiliary seat 16 of the other piston 1. This ensures increasing the contacted areas of the pistons (the valve discs) 1 and dispersing the load. Accordingly, when stacking the pistons (the valve discs) 1 vertically and handling the pistons 1, even if the bosses 10 and 11 of the pistons 1 cannot be brought into contact with one another and the outer diameters of the seats 12 and 13 on both sides (the distances from the centers of the pistons 1 to the outer peripheral ends t1 and t3 of the respective seats 12 and 13) differ, since the seat 12 of the one piston 1 is in contact with the auxiliary seat 16 of the other piston 1, this ensures restraining the deformation of the seats 12 and 13.

Furthermore, with the embodiment, the outer diameter of the seat 13 on the compression-side chamber (the other chamber) B side is smaller than the outer diameter of the leaf valve 2 left from/seated on the seat 12 on the expansion-side chamber (the one chamber) A side. The outer diameter of the leaf valve 3 left from/seated on the seat 13 on the compression-side chamber (the other chamber) B side is smaller than the outer diameter of the leaf valve 2 left from/seated on the seat 12 on the expansion-side chamber (the one chamber) A side. Therefore, the expansion-side damping force can be larger compared with the compression-side damping force.

It should be noted that, with the embodiment, the auxiliary seat 16 is disposed at the position approximately identical to the seat 13 on the compression-side chamber (the other chamber) B side. However, it is only necessary that the auxiliary seat 16 be disposed at a position identical to the seat 13 or higher than the seat 13.

With the embodiment, the seat 13 on the compression-side chamber (the other chamber) B side is positioned higher than the boss 11 on the compression-side chamber B side (the identical side), namely, disposed so as to project. However, the seat 12 on the expansion-side chamber (the one chamber) A side may be disposed at a position higher than the boss 10 on the expansion-side chamber A side (the identical side). Both the seats 12 and 13 on both sides may be disposed at positions higher than the bosses 10 and 11 on the identical side.

With the embodiment, the expansion-side chamber A is the one chamber while the compression-side chamber B is the other chamber; however, the one chamber and the other chamber may be the opposite. In this case, compared with the expansion-side damping force, the compression-side damping force can be increased.

Embodiments of this invention were described above, but the above embodiments are merely examples of applications of this invention, and the technical scope of this invention is not limited to the specific constitutions of the above embodiments.

This application claims priority based on Japanese Patent Application No. 2013-232139 filed with the Japan Patent Office on Nov. 8, 2013, the entire contents of which are incorporated into this specification.

The invention claimed is:

1. A valve, comprising:
a valve disc that partitions a chamber into one chamber and another chamber; and
annular-plate shaped leaf valves including first leaf valves laminated on one chamber side of the valve disc, and second leaf valves laminated on an other chamber side of the valve disc, wherein the valve disc includes:
a first annular boss formed at the one chamber side to support the first leaf valves, and a second annular boss formed at the other chamber side to support the second leaf valves;
a first seat for the first leaf valves formed on an outer peripheral side of the first annular boss on the one chamber side, and a second seat for the second leaf valves formed on an outer peripheral side of the second annular boss on the other chamber side;
an auxiliary seat formed on an outer peripheral side of the second seat on the other chamber side;
a first opening surrounded by the first seat, and a second opening surrounded by the second seat;
one passage that allows the one chamber to communicate with the second opening at the other chamber side; and
another passage that allows the other chamber to communicate with the first opening at the one chamber side,
at least one of the first and second seats being disposed to project past, in a direction parallel to an axial direction, a corresponding one of the first and second annular bosses,
an outer peripheral end of the first seat on the one chamber side being more radially outward than an outer peripheral end of the second seat on the other chamber side,
the auxiliary seat having a height equal to or greater than a height of the second seat on the other chamber side, and being disposed at a position farther radially outward than a position of an outer edge of the second leaf valve,
the first seat and the auxiliary seat being formed at positions overlapping with each other in a side view of the valve disc,
a length, in a direction parallel to the axial direction, from a surface of the first annular boss to a surface of the second annular boss being shorter than a length, in the direction parallel to the axial direction, from a surface of the first seat to a surface of the auxiliary seat.

2. The valve according to claim 1, wherein the first seat on the one chamber side includes a plurality of branches and a plurality of arc-shaped arc portions, the branches extending from the first annular boss on the one chamber side to an outer peripheral side, the arc portion coupling outer peripheral ends of the adjacent branches.

3. The valve according to claim 2, wherein:
the auxiliary seat is formed into an annular shape, the auxiliary seat being disposed at an outer periphery of the second seat on the other chamber side spacing a predetermined interval with the second seat on the other chamber side,
an outer peripheral end of the auxiliary seat is disposed at a position identical to an outer peripheral end of the arc portion or is disposed on an outer peripheral side with respect to the outer peripheral end of the arc portion, and
an inner peripheral end of the auxiliary seat is disposed at a position identical to an inner peripheral end of the arc portion or is disposed on an inner peripheral side with respect to the inner peripheral end of the arc portion.

4. The valve according to claim 1, wherein the valve disc is a mold piston integrated with an annular piston ring, the piston ring being mounted to an outer periphery of the valve disc.

5. The valve according to claim 1, wherein on the other chamber side, the second seat is disposed to project with respect to the second annular boss, and on the one chamber side, the first annular boss is disposed to be equal to the first seat or to project with respect to the first seat.

\* \* \* \* \*